Patented Dec. 28, 1937

2,103,952

UNITED STATES PATENT OFFICE 2,103,952

CARBOHYDRATE DERIVATIVES AND PROCESSES FOR MAKING THE SAME

Leon Lilienfeld, Vienna, Austria

No Drawing. Application July 16, 1934, Serial No. 735,520. In Great Britain July 17, 1933

7 Claims. (Cl. 260—152)

The processes hitherto known for the production of water soluble alkyl derivatives of cellulose, particularly water-soluble ethyl derivatives of cellulose from alkali cellulose or from the alkali compounds of the near conversion products of cellulose are not perfect. Among others, the paramount drawback of those methods is that the yields and/or the properties, particularly the perfect solubility in water or in the other solvents in which many water-soluble alkyl celluloses, particularly ethyl celluloses, are soluble, such as aqueous ethanol or methanol or aqueous acetone, or aqueous pyridine or certain chlorohydrines or aqueous formic or acetic acid or the like, leave much to be desired.

I have discovered that water-soluble alkyl ethers of cellulose of excellent quality can be produced in good yields from alkali cellulose or from alkali compounds of near conversion (including oxidation) products of cellulose, when the alkylation is conducted by action of an alkyl halide in presence of a proportion of caustic alkali to cellulose of at least 0.3, but preferably of at least 0.5 caustic alkali to 1 cellulose and in presence of a proportion of water to cellulose of at least 0.5 water to 1 cellulose, the quantity of water present being in every case larger than the amount of caustic alkali present, but less than three times the weight of the caustic alkali. In these statements of proportions the caustic alkali is figured as NaOH, and the figures represent parts by weight.

According to my present knowledge a suitable modification of the present invention consists in using an amount of caustic alkali that is not substantially larger than the amount of the parent cellulosic material.

In some cases it is even advisable to use an amount of caustic alkali that is smaller than 80 per cent. of the weight of the parent cellulosic material.

In the following lines I give a description of how the present invention may be carried out in practice. This description is given, however, merely by way of illustration and many variations may be made therein without departing from the spirit of my invention.

Among the starting materials that may be used, the following are mentioned by way of example: cellulose in any form, materials containing cellulose, conversion products of cellulose in which the cellulose has not suffered too drastic a change (for example artificial silk waste, cellulose hydrates made for instance by precipitating viscose with acids or heating or long storage of viscose, or by precipitating cuprammonium cellulose with suitable precipitants). The cellulosic materials enumerated in the foregoing paragraph are intended to be covered by the term "cellulose" defined in the last paragraph before the claims.

The necessary amounts of caustic alkali and water can be added either all at once at the beginning of the process, or can be added in portions during the etherification, depending on the raw material selected, the etherifying agent chosen and the temperature at which the reaction is to be carried out.

The alkali can be introduced either in the form of a solution or in the form of solid caustic alkali, or in the form of a mixture of a solution of caustic alkali with solid caustic alkali. If it is desired to introduce the caustic alkali in the form of a solution, this may be done, for example, by steeping for instance cellulose or a conversion product of cellulose in, or otherwise impregnating it with, an excess of the caustic alkali solution and thereafter removing the excess by pressing or centrifuging or the like. Or, the caustic alkali solution may be introduced by simply mixing the celluose with the amount of caustic alkali solution which is desired to be present in the alkali cellulose intended for etherification. If it is contemplated to introduce the caustic alkali in the form of solid caustic alkali or in the form of a mixture of solid caustic alkali with a strong caustic alkali solution, the cellulose material may be mixed with solid caustic alkali or with a mixture of solid caustic alkali and strong caustic alkali solution.

The mixing of the cellulose with the caustic alkali solution or with solid caustic alkali or with a mixture of solid caustic alkali with strong caustic alkali solution is preferably performed in an apparatus or a machine which will give an intimate mixture such as a shredder or an edge runner or a kneading machine or a beater or the like.

In the mixing methods described above it is advisable to take into account the amount of water the solid caustic alkali or the caustic alkali solution or the mixture of the solid caustic alkali and the alkali solution will absorb from the air if the process is to be carried out with free access of the atmosphere thereto.

The etherification is carried out as usual by treatment of the cellulose with alkyl halides in the presence of amounts of water and alkali lying within the limits given above. Either open vessels preferably provided with reflux condensers, or autoclaves may be used depending on the boiling point of the alkylating agent used. For instance, open vessels may be used with ethyl iodide, while autoclaves are necessary with ethyl chloride, methyl chloride, methyl iodide, ethyl bromide, etc. Proper mixing should be provided for by stirring, kneading, agitating, rotating or shaking the vessel or autoclave.

In certain cases (for instance when an excess of the alkylating agent is used) it is favorable to conduct the alkylation in the presence of an alkali carbonate, particularly in the presence of an amount of alkali carbonate substantially exceeding 1 per cent. of the weight of the alkali cellulose, and in some cases it is even favorable to use an amount of alkali carbonate substantially exceeding 10 and even 20 per cent. of the weight of the alkali cellulose.

The alkali carbonate, for example sodium carbonate, may be introduced into the alkali cellulose either by direct addition to the alkali cellulose during or after its preparation or to the caustic soda or to the cellulose before the preparation of the alkali cellulose, or by allowing the alkali cellulose to absorb so much carbon dioxide from the air as to contain the desired amount of alkali carbonate.

The etherification can be carried out in the presence of diluents, such as benzol, ether and the like or catalysts, such as metals, metalloids, etc., (for example copper, or copper salts, or iron, or iron salts).

The process may be carried out in one or more stages, that is to say, the amounts of alkali, water and etherifying agent may be added at the start or, at the beginning, only sufficient quantities may be added to produce a lower ether which is then further etherified in one or more following stages.

Mixed ethers may be produced, either in one operation or in several stages, by allowing different etherifying agents to act.

The following examples of operation serve as practical illustration of the invention, which, however, is in no way limited to the examples; all the less so, since other modes of carrying out the invention will suggest themselves to persons skilled in the art.

The parts are by weight:—

Example 1

100 parts of cellulose containing 5 to 8 per cent. of moisture are alkalized with an excess of caustic soda solution of 30 per cent. strength and the alkali cellulose pressed down to 250 parts. The press-cake is then comminuted in a shredder and ethylated in a rotating autoclave with 100 parts of ethyl chloride at 110° C., the time of heating being 4 to 12 hours.

The reaction mass is then worked up by any method known for the isolation or separation of water-soluble cellulose ethers.

The final product is readily soluble in cold water, but insoluble or only scarcely soluble in boiling water. It is further soluble in aqueous ethanol or aqueous methanol and in some other organic solvents.

Example 2

The process is conducted as in Example 1, but with the difference that 70 parts of sodium carbonate containing about 15 per cent. of moisture evaporable at 105° C. are added to the alkali cellulose and that, instead of 100 parts, 160 parts of ethyl chloride are used.

Example 3

The process is conducted as in Example 1 or 2, but with the difference that the ethyl chloride is diluted with 200 to 300 parts of benzene.

Example 4

The process is conducted as in any one of Examples 1 to 3, but with the difference that, instead of to 250 parts, the alkali cellulose is pressed down to 290 to 300 parts.

Example 5

The process is conducted as in any one of Examples 1 to 3, but with the difference that the strength of the caustic alkali solution used for the preparation of the alkali cellulose is 35 to 40 per cent. of NaOH.

Example 6

100 parts of cellulose containing 5 to 8 per cent of moisture are alkalized with an excess of caustic soda solution of 25 per cent. strength and the alkali cellulose pressed down to 340 to 400 parts. The press-cake is then comminuted in a shredder and then dried under reduced atmospheric pressure at 40 to 60° C. until its weight is 260 to 300 parts. The dried alkali cellulose is then ethylated in a rotating autoclave with 160 parts of ethyl chloride at 110° C., the time of heating being 4 to 12 hours.

The reaction mass is then worked up by any method known for the isolation or separation of water-soluble cellulose ethers.

The final product is readily soluble in cold water, but insoluble or only scarcely soluble in boiling water. It is further soluble in aqueous ethanol or in aqueous methanol and some other organic solvents.

Example 7

The process is conducted as in Example 6, but with the difference that 70 parts of sodium carbonate containing about 15 per cent. of moisture evaporable at 105° C. are added.

Example 8

100 parts of cellulose containing 5 to 8 per cent. of moisture are alkalized with an excess of caustic soda solution of 25 per cent. strength and the alkali cellulose pressed down to 240 parts. The press-cake is then comminuted in a shredder and then dried under reduced atmospheric pressure at 40 to 60° C. until its weight is 210 parts. The dried alkali cellulose is then ethylated in a rotating autoclave with 100 parts of ethyl chloride at 110° C., the time of heating being 4 to 12 hours.

The reaction mass is then worked up by any method known for the isolation or separation of water-soluble cellulose ethers.

The final product is readily soluble in cold water, but insoluble or scarcely soluble in boiling water. It is further soluble in aqueous ethanol or in aqueous methanol and some other organic solvents.

Example 9

The process is conducted as in Example 8, but with the difference that 70 parts of sodium carbonate containing about 15 per cent. of moisture evaporable at 105° C. are added and that, instead of 100 parts, 160 parts of ethyl chloride are used.

Example 10

The process is conducted as in any one of Examples 6 to 9, but with the difference that the ethyl chloride is diluted with 200 to 300 parts of benzene.

Example 11

100 parts of cellulose containing 5 to 8 per cent. of moisture are alkalized with an excess of caustic soda solution of 18 per cent. strength and the alkali cellulose pressed down to 340 parts. The press-cake is then comminuted in a shredder and dried under reduced atmospheric pressure at 40 to 60° C. until its weight is 190 to 200 parts. The dried alkali cellulose is then ethylated in a rotating autoclave with 80 parts of ethyl chloride at 110° C. for 8 to 10 hours.

The reaction mass is then worked up by any method known for the isolation or separation of water-soluble cellulose ethers.

The final product is readily soluble in cold water, but insoluble or only scarcely soluble in hot water. It is further soluble in aqueous ethanol or aqueous methanol and in some other organic solvents.

Example 12

An alkali cellulose prepared by intimate mixing, for example in a shredder, of 100 parts of cellulose containing 5 to 8 per cent. of moisture with 80 parts of a caustic soda solution of 50 per cent. strength and 20 parts of powdered caustic soda, which mixing is conducted in such a manner as to allow the mass to absorb from the air 16 to 20 parts of water during mixing, is heated in a rotating autoclave with 100 parts of ethyl chloride at 110° C. for 4 to 12 hours.

The reaction mass is then worked up by any method known for the isolation or separation of water-soluble cellulose ethers.

The final product is readily soluble in cold water, but insoluble or only scarcely soluble in boiling water. It is further soluble in aqueous ethanol or in aqueous methanol and in some other organic solvents.

Example 13

Mode of procedure as in Example 12, but with the difference that 70 parts of sodium carbonate containing about 15 per cent. of moisture evaporable at 105° C. are added and that, instead of 100, 160 parts of ethyl chloride are used.

Example 14

Mode of procedure as in Example 12 or 13, but with the difference that the ethyl chloride is diluted with 200 to 300 parts of benzene.

Example 15

The process is conducted as in any one of the Examples 12 to 14, but with the difference that, instead of the mixture of 80 parts of caustic soda solution of 50 per cent. strength with 20 parts of powdered caustic soda, 100 parts of caustic soda solution of 50 per cent. strength are used.

Example 16

The process is conducted as in any one of the Examples 12 to 15, but with the difference that, instead of 100 or 160 parts respectively, 400 parts of ethyl chloride are employed, the reaction temperature being 96° C. instead of 110° C.

Example 17

An alkali cellulose prepared by intimate mixing of 100 parts of cellulose containing 5 to 8 per cent. of moisture with 50 parts of a caustic soda solution of 50 per cent. strength and 40 to 50 parts of powdered caustic soda, which mixing is conducted in such a manner as to allow the alkali cellulose to absorb from the air about 70 parts of water during mixing, is heated in a rotating autoclave with 80 parts of ethyl chloride at 110° C. for 6 to 12 hours.

The reaction mass is then worked up by any method known for the isolation or separation of water-soluble cellulose ethers.

The final product is readily soluble in cold water, but insoluble or only scarcely soluble in hot water. It is further soluble in aqueous ethanol or in aqueous methanol and in some other organic solvents.

Example 18

Mode of procedure as in Example 17, but with the difference that 47 parts of sodium carbonate are added to the alkali cellulose.

Example 19

An alkali cellulose prepared by intimate mixing of 100 parts of cellulose containing 5 to 8 per cent. of moisture with 68 parts of caustic soda solution of 50 per cent. strength and 16 parts of powdered caustic soda, which mixing is conducted in such a manner as to allow the alkali cellulose to absorb from the air about 20 parts of water during mixing, is heated in a rotating autoclave with 200 parts of ethyl chloride at 100° C. for 6 to 12 hours.

Example 20

An alkali cellulose prepared by intimate mixing, for example in a shredder, of 100 parts of cellulose containing 5 to 8 per cent. of moisture with 150 parts of caustic soda solution of 50 per cent. strength, whereby the mass is allowed to absorb from the air 20 parts of water, is heated in a rotating autoclave with 100 parts of ethyl chloride at 110° C. for 4 to 12 hours.

The reaction mass is then worked up by any method known for the isolation or separation of water-soluble cellulose ethers.

The final product is readily soluble in cold water, but insoluble or only scarcely soluble in boiling water. It is further soluble in aqueous ethanol or aqueous methanol and in some other organic solvents.

Example 21

The process is conducted as in Example 20, but with the difference that 70 parts of sodium carbonate containing about 15 per cent. of moisture evaporable at 105° C. are added to the alkali cellulose and that, instead of 100 parts, 160 parts of ethyl chloride are used.

Example 22

The process is conducted as in Example 20 or 21, but with the difference that the ethyl chloride is diluted with 200 to 300 parts of benzene.

Example 23

An alkali cellulose prepared by intimate mixing, for example in a shredder, of 100 parts of cellulose containing 5 to 8 per cent. of moisture with 130 to 140 parts of caustic soda solution of 50 per cent. strength, whereby the mass is allowed to absorb from the air 36 to 50 parts of water during mixing, is heated in a rotating autoclave with 100 parts of ethyl chloride at 110° C. for 4 to 12 hours.

The reaction mass is then worked up by any method known for the isolation or separation of water-soluble cellulose ethers.

The final product is readily soluble in cold water, but insoluble or only scarcely soluble in boiling water. It is further soluble in aqueous ethanol or aqueous methanol and in some other organic solvents.

*Example 24*

The process is conducted as in Example 23, but with the difference that the ethyl chloride is diluted with 200 to 300 parts of benzene.

*Example 25*

The process is conducted as in Example 23 or 24, but with the difference that before, or simultaneously with, the addition of the ethyl chloride, 70 parts of sodium carbonate containing about 15 per cent. of moisture evaporable at 105° C. are added to the alkali cellulose and that, instead of 100 parts, 160 parts of ethyl chloride are used.

*Example 26*

An alkali cellulose prepared by intimate mixing, for example in a shredder, of 100 parts of cellulose containing 5 to 8 per cent. of moisture with a mixture of 96 parts of caustic soda solution of 50 per cent. strength, 20 parts of powdered caustic soda and 47 parts of sodium carbonate containing about 15 per cent. of moisture evaporable at 105° C. which mixing is conducted in such a manner as to allow the mass to absorb from the air 37 to 40 parts of water during mixing, is heated in a rotating autoclave with 160 parts of ethyl chloride at 110° C. for 4 to 12 hours.

The reaction mass is then worked up by any method known for the isolation or separation of water-soluble cellulose ethers.

The final product is readily soluble in cold water, but insoluble or only scarcely soluble in boiling water. It is further soluble in aqueous ethanol or aqueous methanol and in some other organic solvents.

*Example 27*

The process is conducted as in Example 26, but with the difference that, before being added, the ethyl chloride is diluted with 200 to 300 parts of benzene.

*Example 28*

The process is conducted as in Example 26 or 27, but with the exception that, instead of 47 parts, 140 parts of sodium carbonate are employed.

*Example 29*

The process is conducted as in any one of Examples 26 to 28, but with the difference that the amount of water absorbed by the alkali cellulose is 45 to 55 parts.

*Example 30*

The process is conducted as in any one of Examples 26 to 29, but with the difference that, instead of the mixture of 96 parts of caustic soda solution of 50 per cent. strength with 20 parts of powdered caustic soda, 160 parts of caustic soda solution of 50 per cent. strength are used.

*Example 31*

The process is conducted as in any one of the preceding examples, but with the difference that the ethylation is conducted at 95 to 96° C. in which case the amount of ethyl chloride may be raised to about the stoichiometric proportion.

In the foregoing examples, instead of ethyl chloride, chemically equivalent proportions of methyl chloride or propyl chloride may be used.

Needless to say, the excess (if any) of the alkyl halide used in the foregoing examples and also the diluents (if any), such as benzene or chlorobenzene or the like can be recovered by distillation.

The term "alkyl derivative" used in the description and claims is, wherever the context permits, intended to include simple and mixed alkyl derivatives, simple and mixed hydroxy-alkyl derivatives and such mixed ethers as contain alkyl and hydroxy-alkyl groups.

The term "cellulose" used in the description and claims is, wherever the context permits, intended to include cellulose, its conversion and oxidation products, such as cellulose hydrate, hydrocellulose, oxycellulose, acidcellulose or the like.

What I claim is:

1. Process for the manufacture of water-soluble alkyl derivatives of cellulose, wherein the alkylation is effected by means of an alkyl halide and is conducted in the presence of a proportion of caustic alkali to cellulose of at least 0.3 but not substantially over 0.8 part of caustic alkali calculated as NaOH, to 1 part of cellulose and in the presence of a proportion of water to cellulose of at least 0.5 part of water to 1 part of cellulose, the quantity of water present being in every case larger than the amount of caustic alkali present calculated as NaOH, but smaller than three times the weight of the caustic alkali calculated as NaOH.

2. A process as claimed in claim 1, wherein the caustic alkali, calculated as NaOH, is present in an amount of at least 0.5 part per 1 part of cellulose.

3. A process as claimed in claim 1, wherein th alkylation is conducted in the presence of a proportion of alkali carbonate substantially exceeding 1 per cent. of the weight of the alkali cellulose.

4. A process as claimed in claim 1, wherein a proportion of alkali carbonate substantially exceeding 10 per cent. of the weight of the alkali cellulose is present during the alkylation step.

5. A process as claimed in claim 1, wherein the amount of caustic alkali present, calculated as caustic soda, is substantially less than four-fifths of the amount of cellulose.

6. A process of making water-soluble alkyl ethers of cellulose by reacting upon cellulose in the presence of water and caustic alkali with an alkyl halide, in which the amount of the cellulose is 92 to 95 parts, the amount of caustic alkali, figured as NaOH is about 60 to 70 parts and the amount of water present during etherification is about 60 to about 107 parts, the amount of water being not less than the amount of caustic alkali.

7. An alkyl derivative of cellulose which is perfectly soluble in aqueous ethanol and in cold water, and substantially identical with the products produced by the process of claim 1.

LEON LILIENFELD.